D. F. GRAHAM.
ANTIFRICTION BEARING.
APPLICATION FILED JAN. 10, 1911.
1,105,133.
Patented July 28, 1914.
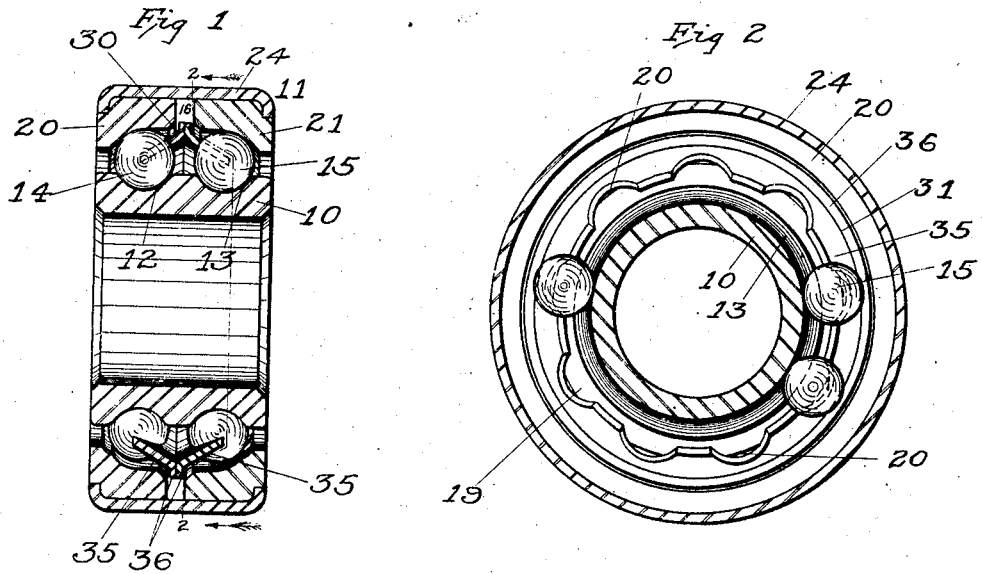
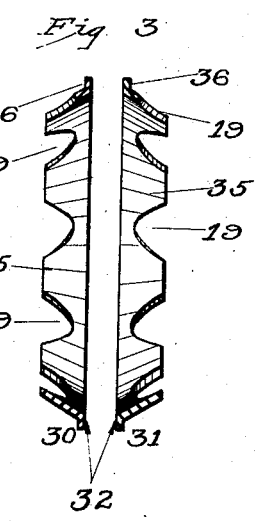
WITNESSES:
Harry W. Tuttle
Alice E. Brown
INVENTOR:
David F. Graham,
BY
Gales P. Moore
his ATTORNEY

UNITED STATES PATENT OFFICE.

DAVID F. GRAHAM, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,105,135.   Specification of Letters Patent.   Patented July 28, 1914.

Application filed January 10, 1911. Serial No. 601,852.

*To all whom it may concern:*

Be it known that I, DAVID F. GRAHAM, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to anti-friction bearings, and more particularly to the separator for the balls or other anti-friction-members of a bearing embodying two such rows. In so-called double row ball bearings it has been customary to employ a unitary separator having pockets or recesses in its opposite edges for receiving the balls of the respective rows. But in some instances this has proved unsatisfactory. It is practically impossible to produce races of exactly the same diameter for each row of balls. Therefore, it frequently happens that in a double row bearing one row of balls tends to travel faster than the other row, and the result is that the unitary separator engaged by both rows of balls is held back by engagement with the slower row while the balls of the faster row press against the separator in their effort to travel about the center of rotation of the bearing. The separator thus becomes jammed between the balls of the two rows and, consequently, interferes with the free rolling of the balls. Frequently the balls thus jammed wear away the pocket-walls of the separator, and in some instances the strain causes the separator to break.

My object is to provide a structure in which the balls of each row are held properly spaced or separated and yet each row can rotate independently of the other.

A further object is to provide a separator which permits the accomplishment of the object just above recited.

To these ends, and also to improve generally upon devices of the character indicated, my invention consists in the various matters hereinafter described and claimed.

In the accompanying drawings: Figure 1 is a sectional elevation of a bearing embodying my invention; Fig. 2 is an elevation, partly in section, on about the line 2—2 of Fig. 1, looking in the direction of the arrows, all but three of the balls being removed; and Fig. 3 is a sectional elevation of the separator alone, its sections being shown spaced from each other.

In said drawings, 10 represents the inner race-member, 11 the outer race-member, 14 and 15 the balls or ball-sets of the respective two rows between said race members, and 16 the separator. The inner race-member is illustrated as a sleeve or supporting member having the separated circumferential ball grooves or races 12 and 13, while the outer race-member is shown as an annulus comprising the cup-rings 20 and 21 held together by the casing ring 24 to move as a single element.

The separator 16 is split and comprises the separate rings or separator-sections 30 and 31. Each separator-section can be termed a separator. Each of these separator-sections has recesses or pockets 19 in its outer edge to receive the balls of the appropriate row, and each said ring also has a relatively broad, flat inner face 32 which abuts against the corresponding face of the coöperating ring. Thus, each separator section can rotate independently of the other, so that each row of balls can rotate at its own speed without detriment to the other balls or to the separator. But, at the same time, the balls are properly spaced and separated and the separator-sections, abutting against each other and almost filling the space between the rows of balls, are securely held against wabbling and displacement.

In the illustrated embodiment of my invention, each separator-section is made of a single piece of relatively thin metal and has a flared portion 35 in which the said pockets 19 are formed, each said section also having a flange 36 which affords the said relatively broad abutting-face 32. The ball-engaging member or flared portion 35 is disposed angularly relatively to the axis of its travel. These separator sections can be stamped and occupy but little space. Thus, by my present invention each row of balls of a double row bearing can rotate at its own speed without damage to the other balls or to the separator, and the separator is securely held against wabbling or other undesirable displacement, the separator occupying but small space and being easily and inexpensively produced.

Having thus described my invention, what

I claim as new and desire to secure by Letters Patent is—

1. The combination with a supporting member having a pair of separated raceways, an annulus having a pair of raceways coöperative with those of the supporting member, and a pair of ball-sets in the raceways in the supporting member and annulus, respectively, of a pair of flared separators for said ball-sets, respectively, and having at their adjacent faces flanges contacting with each other for guiding both separators for independent free travel with their ball-sets, respectively.

2. The combination with a supporting member having a pair of separated raceways, an annulus having a pair of raceways coöperative with those of the supporting member, and a pair of ball-sets in the raceways in the suppporting member and annulus, respectively, of a pair of separators coöperative with said ball-sets, respectively, each separator having a ball-engaging member disposed angularly relatively to the axis of its travel, and contacting with each other for guiding each other for independent travel relatively to each other.

In testimony whereof, I hereunto affix my signature, in the presence of two witnesses.

DAVID F. GRAHAM.

Witnesses:
 WILLIAM E. WIGHTMAN,
 GALES P. MOORE.